US008677235B2

(12) United States Patent  (10) Patent No.: US 8,677,235 B2
Chronister et al.  (45) Date of Patent: Mar. 18, 2014

(54) RANKING VISUALIZATION TYPES BASED UPON FITNESS FOR VISUALIZING A DATA SET

(75) Inventors: Benjamin L Chronister, Duvall, WA (US); Daniel Philip Cory, Seattle, WA (US); David Benjamin Lee, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 771 days.

(21) Appl. No.: 12/120,227

(22) Filed: May 13, 2008

(65) Prior Publication Data

US 2009/0287673 A1 Nov. 19, 2009

(51) Int. Cl.
G06F 3/00 (2006.01)
(52) U.S. Cl.
USPC .......................................................... 715/253
(58) Field of Classification Search
USPC ........................... 715/234, 243, 253, 254, 255
See application file for complete search history.

(56) References Cited

U.S. PATENT DOCUMENTS

| 6,535,872 | B1 | 3/2003 | Castelli | |
|---|---|---|---|---|
| 7,143,370 | B1 | 11/2006 | Erhardt | |
| 7,158,983 | B2 | 1/2007 | Willse et al. | |
| 2002/0107842 | A1 | 8/2002 | Biebesheimer et al. | |
| 2002/0116417 | A1* | 8/2002 | Weinberg et al. | 707/517 |
| 2004/0061702 | A1 | 4/2004 | Kincaid | |
| 2004/0090472 | A1 | 5/2004 | Risch et al. | |
| 2004/0174397 | A1 | 9/2004 | Cereghini et al. | |
| 2004/0181543 | A1 | 9/2004 | Wu et al. | |
| 2004/0267700 | A1* | 12/2004 | Dumais et al. | 707/2 |
| 2005/0203850 | A1 | 9/2005 | Heussi-Pfleger | |
| 2005/0203860 | A1* | 9/2005 | D'Souza et al. | 706/50 |
| 2006/0028471 | A1 | 2/2006 | Kincaid et al. | |
| 2007/0061611 | A1* | 3/2007 | Mackinlay et al. | 714/5 |
| 2007/0100824 | A1* | 5/2007 | Richardson et al. | 707/7 |
| 2008/0005677 | A1 | 1/2008 | Thompson | |
| 2008/0036767 | A1 | 2/2008 | Janzen | |

FOREIGN PATENT DOCUMENTS

| RU | 2005125839 | 2/2007 |
|---|---|---|
| WO | WO0137072 A1 | 5/2001 |
| WO | WO 03/038679 | 5/2003 |

OTHER PUBLICATIONS

Pinnel, et al., "Design of Visualizations for Urban Modeling", In VisSym '00: Joint Eurographics—IEEE TCVC Symposium on Visualization, 2000, pp. 10.

North, et al., "Visualization Schemas for Flexible Information Visualization",Proceedings of the IEEE Symposium on Information Visualization 2002 (InfoVis'02), IEEE Computer Society, IEEE, 2002, pp. 8.

(Continued)

*Primary Examiner* — Kyle Stork
(74) *Attorney, Agent, or Firm* — Rachael Vaughn; Leonard Smith; Micky Minhas

(57) ABSTRACT

Technologies are described herein for ranking visualization types. In order to rank the visualization types, visualization metadata is generated for each of the visualization types and data set metadata is generated for the data set. A suitability score is then computed based upon the visualization metadata and the data set metadata through the use of data mapping rules and chart selection rules. The visualization types are then ranked according to the computed scores. A user interface may then be displayed that includes visual representations corresponding to the visualization types that are ordered according to the ranking. One of the visual representations may then be selected to apply the corresponding visualization type to the data set.

13 Claims, 6 Drawing Sheets

(56) References Cited

OTHER PUBLICATIONS

North, et al., "Visualization Schemas and a Web-Based Architecture for Custom Multiple-View Visualization of Multiple-Table Databases", Information Visualization, vol. 1, Nos. 3-4, Dec. 2002, Palgrave Macmillan Ltd., pp. 211-228.

Mackinlay, et al., "Show Me: Automatic Presentation for Visual Analysis", vol. 13, Issue 6, IEEE Transactions on Visualization and Computer Graphics, 2007, pp. 8.

International Search Report dated Jan. 13, 2010 in International Application No. PCT/US2009/038825.

Pinnel et al., "Design and Understanding of Visualizations for Urban Modeling", Dec. 1999, Technical Report UW-CSE 99-12-01, University of Washington, http://www.urbansim.org/pub/Research/ResearchPapers/UVtechl.pdf, 8 pages.

European Search Report dated Dec. 19, 2011 in European Application No. 09747056.1.

Russian Official Action dated Nov. 29, 2012 in Russian Application No. 2010146224/08(066668).

Chinese Official Action dated Oct. 10, 2012 in Chinese Application No. 200980117837.1.

Russian Notice of Allowance dated Jan. 17, 2013 in Russian Application No. 2010146224/08.

Chinese Official Action dated Jun. 24, 2013 in Chinese Application No. 200980117837.1.

"TeacherBridge Survey Data Visualization", retrieved Mar. 13, 2008 from http://anxiousplanet.com/thesis/SurveyViz.php?surveyIS=11, 1 page.

Chinese Official Action dated Jan. 15, 2014 in Chinese Application No. 200980117927.1.

\* cited by examiner

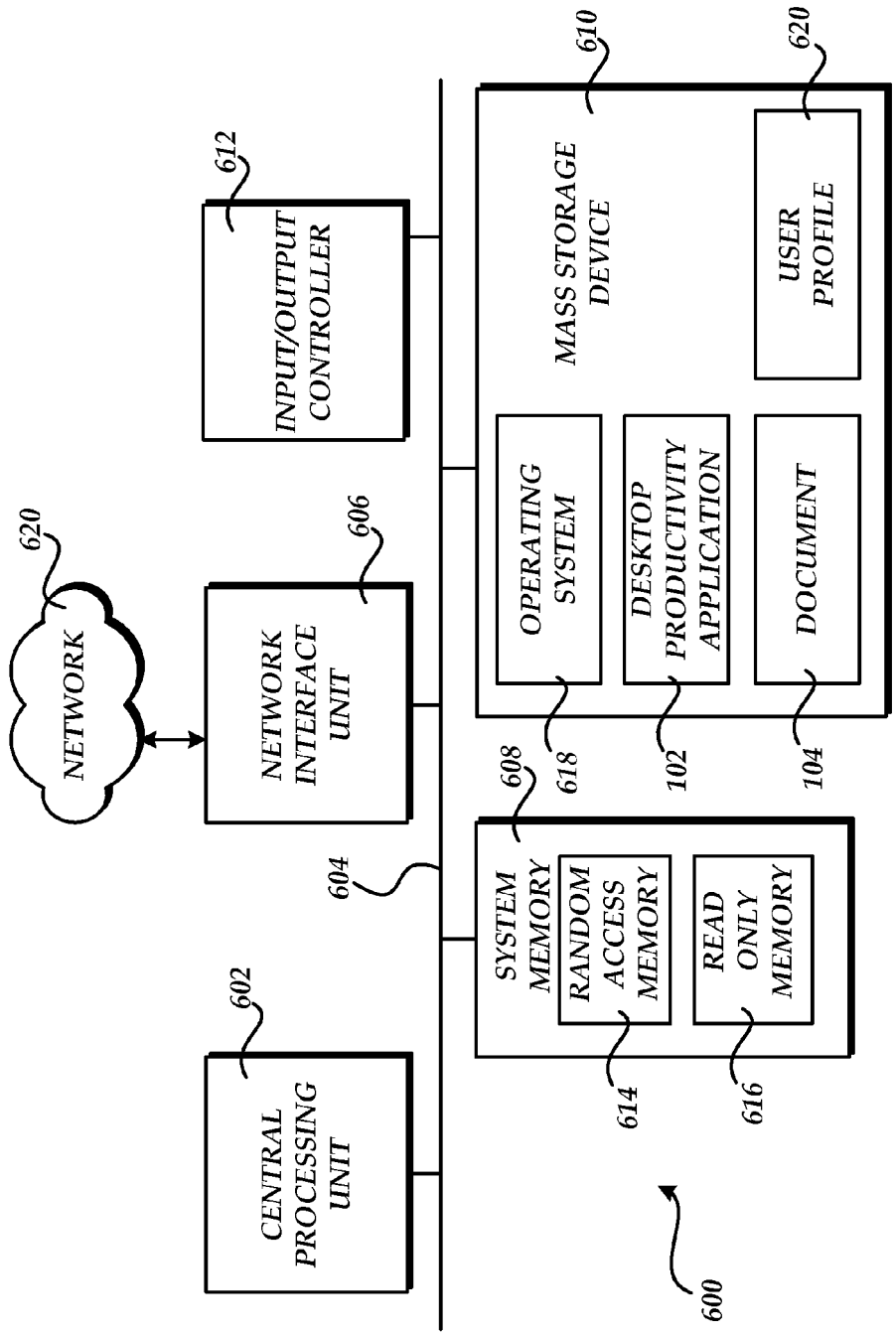

RANKING VISUALIZATION TYPES BASED UPON FITNESS FOR VISUALIZING A DATA SET

BACKGROUND

Desktop productivity applications typically provide many options for visualizing data. For instance, a spreadsheet application program may allow a user to select a column chart, a line chart, a pie chart, a bar chart, an area chart, a scatter chart, or another type of chart for visualizing the contents of a data set. Each type of chart can be used more or less effectively to represent the data in a given data set. As an example, a pie chart may be well suited for visualizing a certain data set while a scatter chart would not be well suited for visualizing the same data set.

In order to visualize a data set, a desktop productivity application program will generally ask a user to select one of the available visualization types. Making such a selection may be difficult, however, since many users will not know the visualization type that is best suited for their data set and may not know the range and extent of their own data. Many users may also be unaware of all of the visualization types that are available, especially where a large number of visualization types are provided or unusual or domain specific visualization types are available. As a result, it can be difficult for many users to choose a visualization type that is optimal for displaying their particular data set.

Once a user has selected a visualization type, it is also generally necessary to configure the visualization type for use with the data set. For instance, it is typically necessary to map columns of data within a data set to axes in the selected visualization type. In some cases the desktop productivity application may make basic assumptions about the data in order to automatically perform the mapping. If the application does not perform this function, or if the mapping generated by the application program is not optimal, the desktop productivity application may ask the user how the data in the data set should be mapped to the axes of the selected chart type. This also can be frustrating for a user that is not equipped to specify the most optimal mapping between the data in their data set and the selected visualization type.

It is with respect to these considerations and others that the disclosure made herein is presented.

SUMMARY

Technologies are described herein for ranking visualization types. In particular, through the use of the technologies presented herein, visualization types are ranked according to their fitness for use with a particular data set. A user interface showing the ranked visualization types may then be presented to a user, thereby allowing the user to select the most appropriate visualization type for their data set. Additionally, through the ranking process presented herein, each visualization type is configured for use with the data set using rules that are applied to characteristics of the data set. In this manner, a user can more easily select a visualization type that is best suited for their data set and avoid the tedious process of configuring the visualization type for the data set as previously required.

According to one aspect presented herein, a desktop productivity application is provided that includes one or more visualization types for visualizing the contents of a data set, such as tabular data. The visualization types may include various types of charts, diagrams, graphs, and other forms of visual presentation for the contents of a data set. In order to assist a user with the selection of one of the visualization types and with the configuration of a selected visualization type, the desktop productivity application presented herein also provides functionality for ranking the available visualization types according to their fitness for use with a particular data set.

In order to rank the visualization types, visualization metadata is generated for each of the visualization types. The visualization metadata is data that describes one or more attributes of a visualization type. For instance, the visualization metadata may describe the preferred inputs for a particular visualization type. Data set metadata is also generated for the data set. Data set metadata is data describing one or more attributes of the data set. For instance, data set metadata may describe the data type, mathematical properties, or other inherent properties of the data set. A calculation is applied to properties of the data set metadata to indicate preferred inputs for a visualization type.

Once the visualization metadata and the data set metadata have been generated, a suitability score is calculated for each of the visualization types. The suitability score is generated based upon the visualization metadata and the data set metadata and indicates the suitability of each visualization type for use with the data set. In order to generate the suitability score, data mapping rules are utilized to create a mapping between columns in the data set and each axis or series in the visualization type. The data mapping rules specify how data should be preferably mapped to each axis or series in the visualization type. Chart selection rules are then utilized to calculate the suitability score for the visualization type in view of the mapping. Once the suitability scores have been generated, the visualization types are ranked according to the scores. Other factors, such as a user profile, may also be utilized during ranking.

Once the visualization types have been ranked, a user interface may be displayed that includes visual representations corresponding to the visualization types that are ordered according to the ranking. For instance, thumbnail images may be displayed corresponding to each of the visualization types that are ranked in order of decreasing suitability score. A user may select one of the visual representations to apply the corresponding visualization type to the data set. The mapping generated for the selected visualization type during the ranking process is then utilized to map the selected visualization type to the data set.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 is a computer architecture diagram showing an illustrative computer hardware and software architecture for a computing system capable of implementing aspects of the embodiments presented herein.

DETAILED DESCRIPTION

Figure 1:
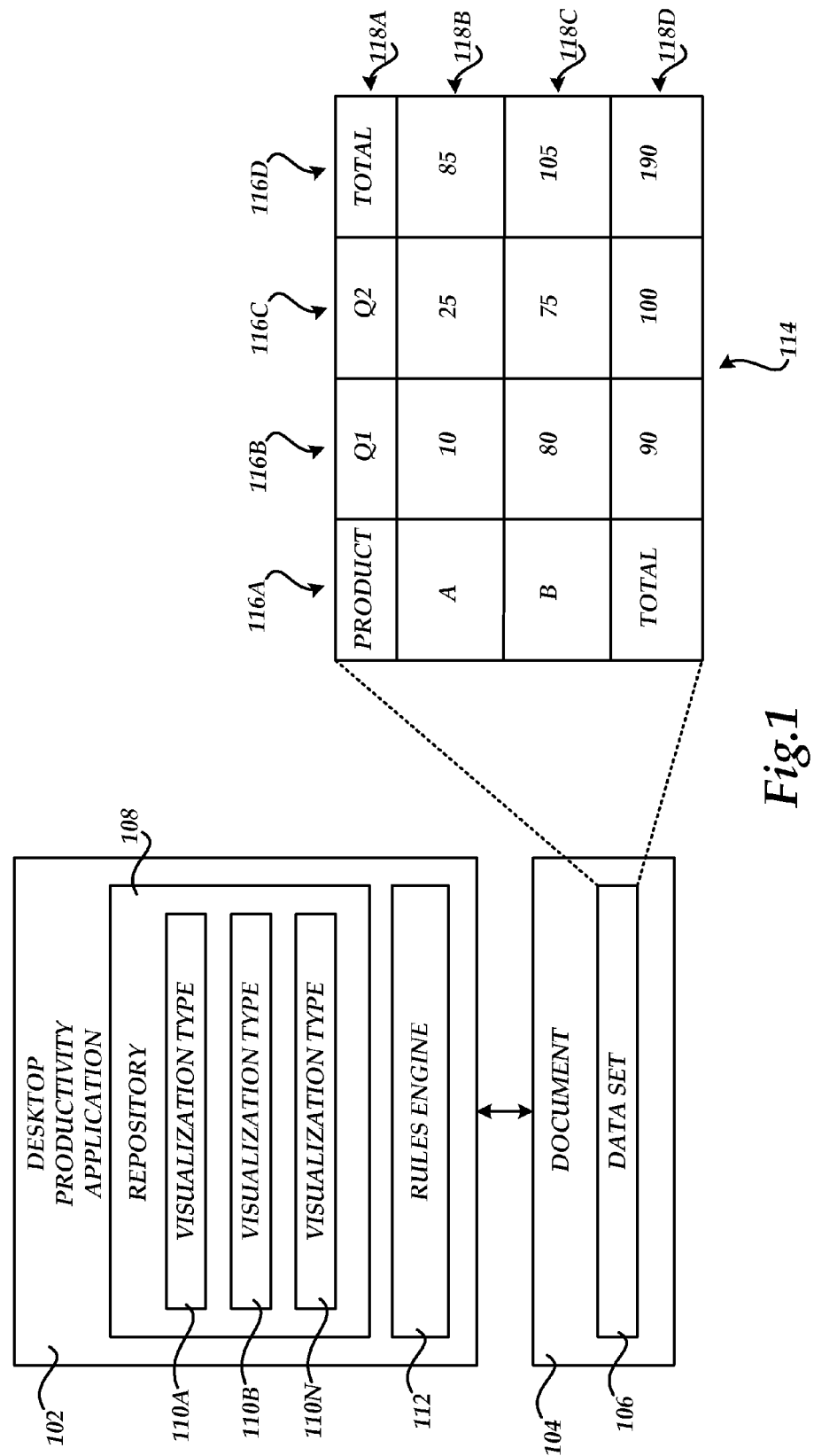
FIG. 1 is a software architecture diagram showing aspects of several software components provided herein and an illustrative data set utilized in one embodiment presented herein.

The following detailed description is directed to technologies for ranking visualization types. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for ranking the fitness of visualization types will be described.

Turning now to FIG. 1, details will be provided regarding several software components provided by the embodiments presented herein. In particular, the embodiments presented herein provide a desktop productivity application 102 that is configured to provide a ranking of one or more visualization types 110A-110N based upon their fitness for visualizing a data set 106. In one implementation described herein, the desktop productivity application 102 comprises a spreadsheet application capable of creating and editing a spreadsheet document. It should be appreciated, however, that the embodiments presented herein are not limited to use with a spreadsheet application program. Rather, the embodiments presented herein may be utilized with any desktop productivity application and other types of applications that provide functionality for visualizing a data set.

Through the use of the desktop productivity application 102, a user can create, edit, or view a document 104 that includes a data set 106. In one embodiment, the data set 106 comprises a table 114. It should be appreciated, however, that the data set 106 may comprise other types of structured data, including numeric or free form text data, that has been formatted in another manner. Through the use of the desktop productivity application 102, a user can also graphically visualize the contents of the data set 106. In this regard, the desktop productivity application 102 maintains a repository 108 containing the visualization types 110A-110N and includes functionality for rendering the visualization types 110A-110N. As mentioned briefly above, the visualization types 110A-110N may include various types of charts, diagrams, graphs, or other forms of visual presentation for visualizing the contents of the data set 106. According to implementations, the visualization types 110A-110N include column charts, line charts, pie charts, bar charts, area charts, scatter charts, and others.

In order to assist a user with the selection of one of the visualization types 110A-110N for use with the data set 106, the desktop productivity application 102 includes functionality for ranking the available visualization types 110A-110N according to their fitness for use with the data set 106. In this regard, the desktop productivity application 102 is configured to utilize a rules engine 112. As will be discussed below, the rules engine 112 includes functionality for generating a suitability score for each of the visualization types 110A-110N with respect to the data set 106. Although the rules engine 112 has been shown as being a part of the desktop productivity application 102 in FIG. 1, the rules engine 112 may be a separate software component executing separately from the desktop productivity application 102. Additional details regarding the structure and execution of the rules engine 112 will be provided below with respect to FIG. 2.

As discussed briefly above, the data set 106 comprises a table 114 in one embodiment described herein. The illustrative table 114 shown in FIG. 1 includes a number of columns 116A-116D and a number of rows 118A-118D. As will be discussed in greater detail below, the rules engine 112 is configured in one embodiment to map the columns 116A-116D of the table 114 to the axes or series of each visualization type 110A-110N. Based upon the suitability of this mapping for the type of data contained within the table 114, a suitability score 210 is generated indicating the suitability of each of the visualization types 110A-110N for use with the table 114. Additional details regarding this process will be provided below with respect to FIGS. 2-4.

Figure 2:
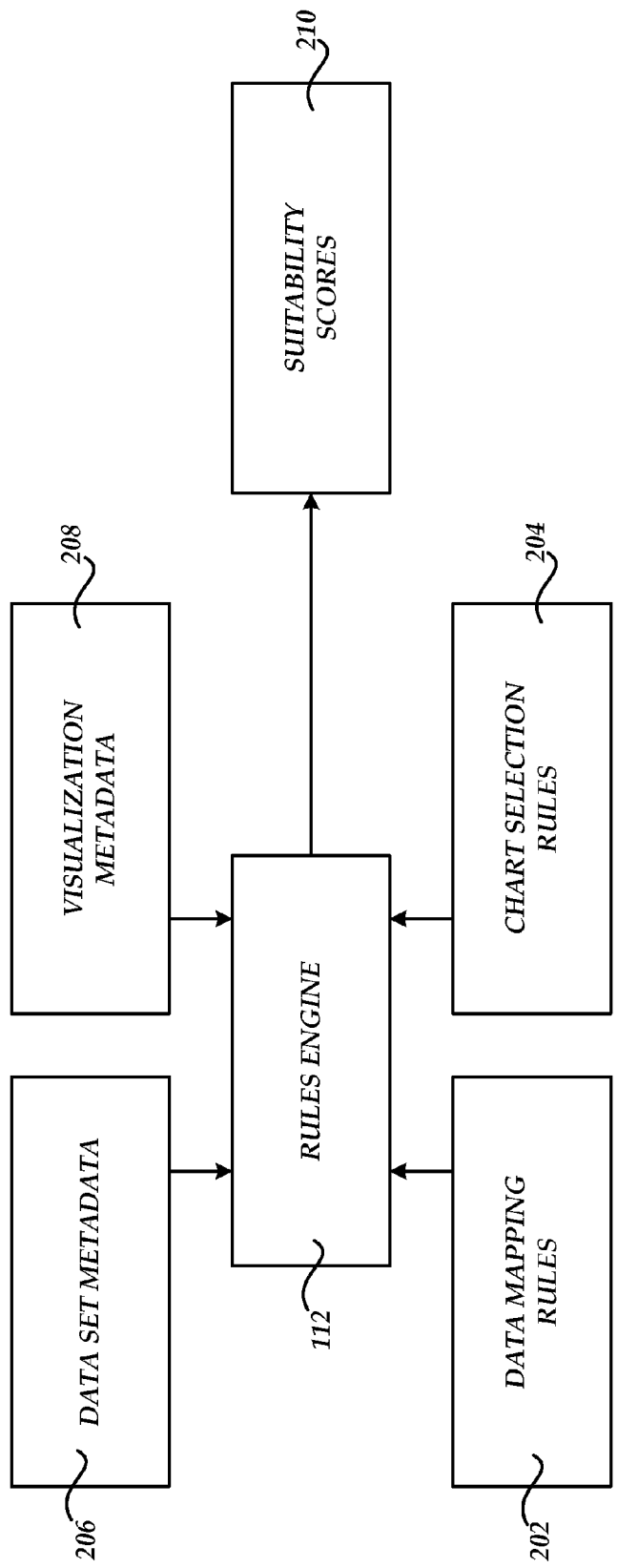
FIG. 2 is a software architecture diagram showing additional aspects of several software components provided herein in one embodiment.

Referring now to FIG. 2, additional details will be provided regarding the operation of the rules engine 112 and several additional software components utilized therewith. As shown in FIG. 2, the rules engine 112 takes data set metadata 206 and visualization metadata 208 as input. The visualization metadata 208 is data that is specified for each of the visualization types 110A-110N and that describes one or more attributes of each of the visualization types. For instance, the visualization metadata 208 may describe the preferred inputs for a particular visualization type. In this regard, the visualization metadata 208 may specify the various axes or series within each of the visualization types 110A-110N and specify attributes regarding the preferred type of data for each of the axes or series.

The data set metadata 206 is data that describes one or more inherent attributes of the data set 106. For instance, as discussed above, the data set metadata 206 may describe the data type, mathematical properties, or other properties of the data set 106. The data set metadata 206 may be specified for the entire data set 106 or, in the case of tabular data, for each of the columns 116A-116D independently. As will be discussed in greater detail below, the rules engine 112 utilizes the data set metadata 206 and the visualization metadata 208 to generate a mapping between the data within the data set 106 and the axes or series within each of the visualization types 110A-110N. Once this mapping has been generated, a suitability score 210 is computed for each of the visualization types 110A-110N. The suitability score indicates the suitability of each visualization type 110 for use in visualizing the contents of the data set 106.

In order to generate the suitability scores 210, the rules engine 112 utilizes data mapping rules 202 to create a mapping between the columns 116A-116D in the data set 106 to each axis or series in a visualization type 110. As discussed briefly above, the data mapping rules 202 specify the type data that should be preferably mapped to each axis or series in each of the visualization types 110A-110N. The data mapping rules 202 may also use other attributes from the data set metadata to assist with the mapping between the data set and the axes or series in a visualization type. Once this mapping has been created, the chart selection rules 204 are utilized by the rules engine 112 to calculate the suitability score 210 for each of the visualization types 110A-110N.

As will be described in greater detail below, once the suitability scores 210 have been generated for each of the visualization types 110A-110N, the visualization types 110A-110N can be ranked according to the calculated scores 210. It should appreciated that, in addition to the suitability scores 210, other factors may also be utilized to inform the ranking of the visualization types 110A-110N. For instance, in one implementation presented herein, a user profile is utilized as an input to the ranking process. The user profile may specify, for instance, that a user prefers certain types of visualization types 110A-110N over others. As an example, a user may specify in their user profile that they prefer visualization types 110 that are configured for displaying scientific data. Through the use of this information during the ranking process, certain visualization types 110A-110N may be ranked higher than other types of visualizations. In other embodiments, social or large group favorites may be utilized to alter the suitability score. Additional details regarding the operation of the rules engine 112 and its use of the data set metadata 206, the visualization metadata 208, the data mapping rules 202, and the chart selection rules 204 in generating the suitability scores 210 will be provided below with respect to FIG. 3-4.

Figure 3:
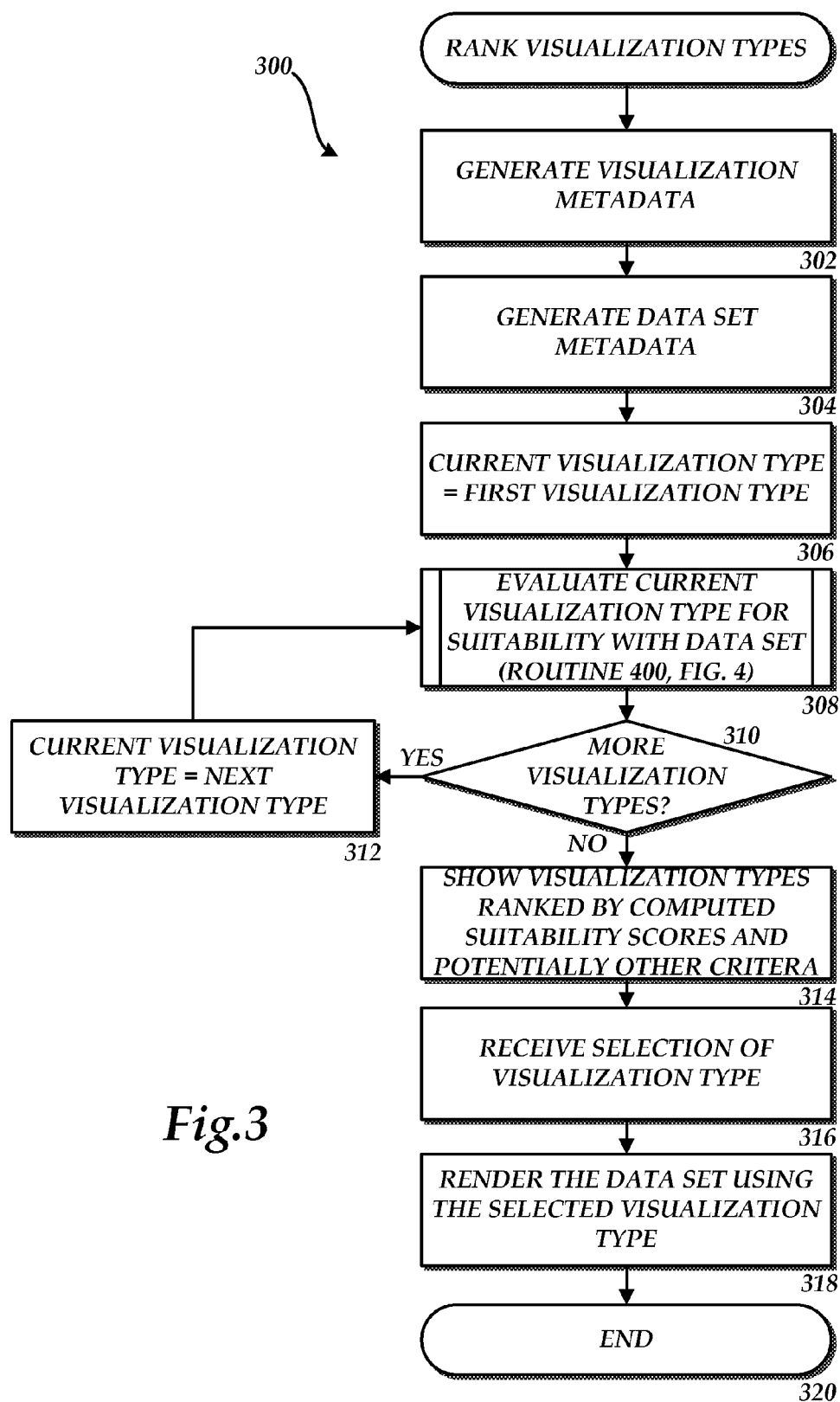
FIGS. 3-4 are flow diagrams showing one illustrative routine for ranking visualization types according to one embodiment presented herein.
Figure 4:
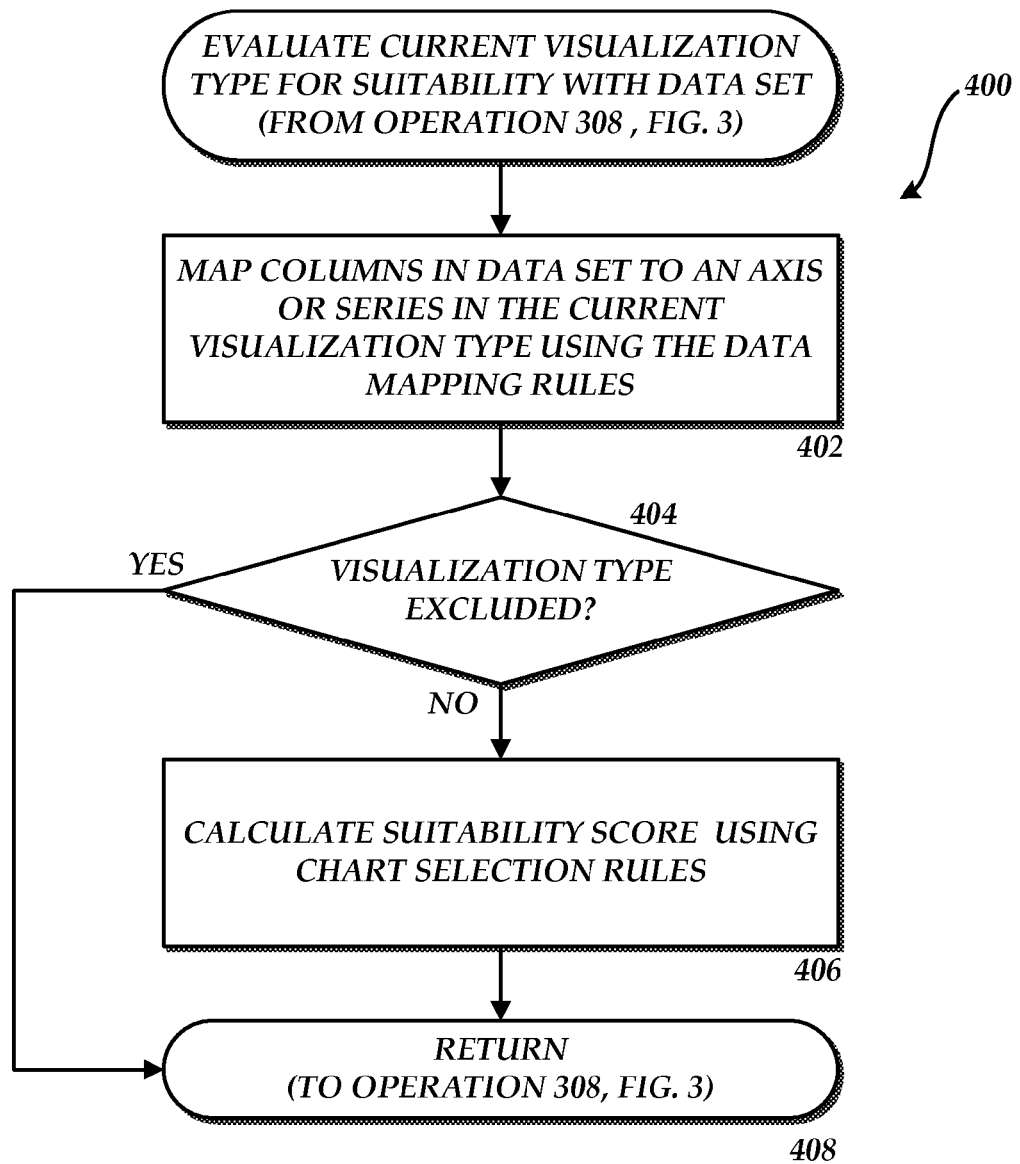

Turning now to FIGS. 3-4, additional details will be provided regarding the embodiments presented herein for ranking the fitness of visualization types for use with a data set. In particular, FIGS. 3-4 are flow diagrams illustrating one process presented herein for ranking the fitness of the visualization types 110A-110N with a data set 106. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where the visualization metadata 208 is generated for each of the visualization types 110A-110N. As discussed above, the visualization metadata 208 is data that describes one or more attributes of a visualization type 110. It should be appreciated that the visualization metadata 302 may be generated and stored for each of the visualization types 110A-110N prior to the time at which a ranking of the visualization types 110A-110N is performed for a particular data set 106. In this manner, the operation 302 may be performed once for each of the visualization types 110A-110N and not repeated. From operation 302, the routine 300 proceeds to operation 304.

At operation 304, the desktop productivity application 102 generates the data set metadata 206. As discussed above, the data set metadata 206 is data that describes one or more inherent attributes of the data set 106. Once the data set metadata 206 has been generated, the routine 300 proceeds to operation 306, where a temporary variable is initialized that is utilized to store data identifying a current visualization type. The variable is initially set to the first visualization type 110A in the repository 108. From operation 306, the routine 300 proceeds to operation 308.

At operation 308, the visualization type 110A specified by the temporary variable is evaluated for its suitability for use with the data set 106. As will be discussed in greater detail below with respect to FIG. 4, the rules engine 112 evaluates the suitability of each visualization type 110A-110N by calculating a suitability score 210 for each visualization type. Additional details regarding this process will be provided below with respect to FIG. 4.

Once a suitability score 210 has been generated for the current visualization type, the routine 300 proceeds to operation 310 where a determination is made as to whether additional visualization types remain in the repository 108 for which a suitability score 210 should be calculated. If so, the routine 300 proceeds from operation 310 to operation 312 where the value of the temporary variable is set to the next visualization type 110B in the repository 108. From operation 312, the routine 300 returns to operation 308, described above.

It should be appreciated that, according to embodiments, unsuitable visualization types may be discarded from consideration. For instance, all visualization types that have a suitability score that is below a set or configurable threshold may be discarded. In these cases, visualization types that are considered to be inappropriate or bad for the data set based upon their suitability scores may be eliminated from consideration prior to operation 310.

If, at operation 310, it is determined that all of the visualization types 110A-110N in the repository 108 have been considered, the routine 300 proceeds to operation 314. At operation 314, the desktop productivity application 102 shows each of the visualization types ranked according to their computed suitability score 210. As also discussed above, the ranking process may include modifying the ranking based upon other criteria, such as the contents of a user profile.

As will be discussed in greater detail below with respect to FIG. 5, a user interface is also provided in one implementation that includes graphical representations of each of the visualization types 110A-110N that are ordered according to decreasing suitability scores 210. Through this user interface, a user may select one of the visual representations to cause the corresponding visualization type 110 to be applied to the data set 106. Additional details regarding such a user interface will be provided below with respect to FIG. 5.

From operation 314, the routine 300 proceeds to operation 316, where the desktop productivity application 102 receives a selection of one of the visualization types 110A-110N that have been presented to the user in ranked order. In response to such a selection, the routine 300 continues from operation 316 to operation 318 where the data set 106 is rendered utilizing the selected visualization type 110. In order to render the selected visualization type, the mapping generated between the columns 116A-116D contained within the data set 106 and the axes or series within the selected visualization type 110 are utilized to map the data within the data set 106 to the selected visualization type 110. Once the data set 106 has been rendered utilizing the selected visualization type 110, the routine 300 proceeds to operation 320, where it ends.

As discussed above with reference to operation 308, the rules engine 112 is configured to evaluate each visualization type for suitability with the data set 106. FIG. 4 shows a routine 400 that illustrates additional details regarding this process. In particular, the routine 400 begins at operation 402, where the columns 116A-116D within the data set 106 are mapped to an axis or series in the current visualization type 110. In order to perform this process, the rules engine 112 utilizes the data mapping rules 202. As discussed above, the data mapping rules 202 specify the type of data that should be preferably mapped to each axis or series within the current visualization type 110.

From operation 402, the routine 400 proceeds to operation 404 where the rules engine 112 determines whether the current visualization type 110 has been excluded from consideration. A visualization type may be excluded from consideration, for instance, if the columns 116A-116D of the data set 106 do not map appropriately to the axes or series within the visualization type. Visualization types may also be excluded for other types of unsuitability for use with the data set 106. If the current visualization type has been excluded, the routine 400 proceeds from operation 404 to operation 408. If the current visualization type has not been excluded, however, the routine 400 proceeds from operation 404 to operation 406.

At operation 406, the rules engine 112 computes the suitability score 210 for the current visualization type 110 using the chart selection rules 204. As discussed above, the chart selection rules provide a score that indicates how suitable the current visualization type is for use with the data set 106 in view of the mapping performed at operation 402. Once the suitability score 210 has been calculated for the current visualization type, the routine 400 proceeds to operation 408, where it returns to the operation 308, described above with reference to FIG. 3.

Figure 5:
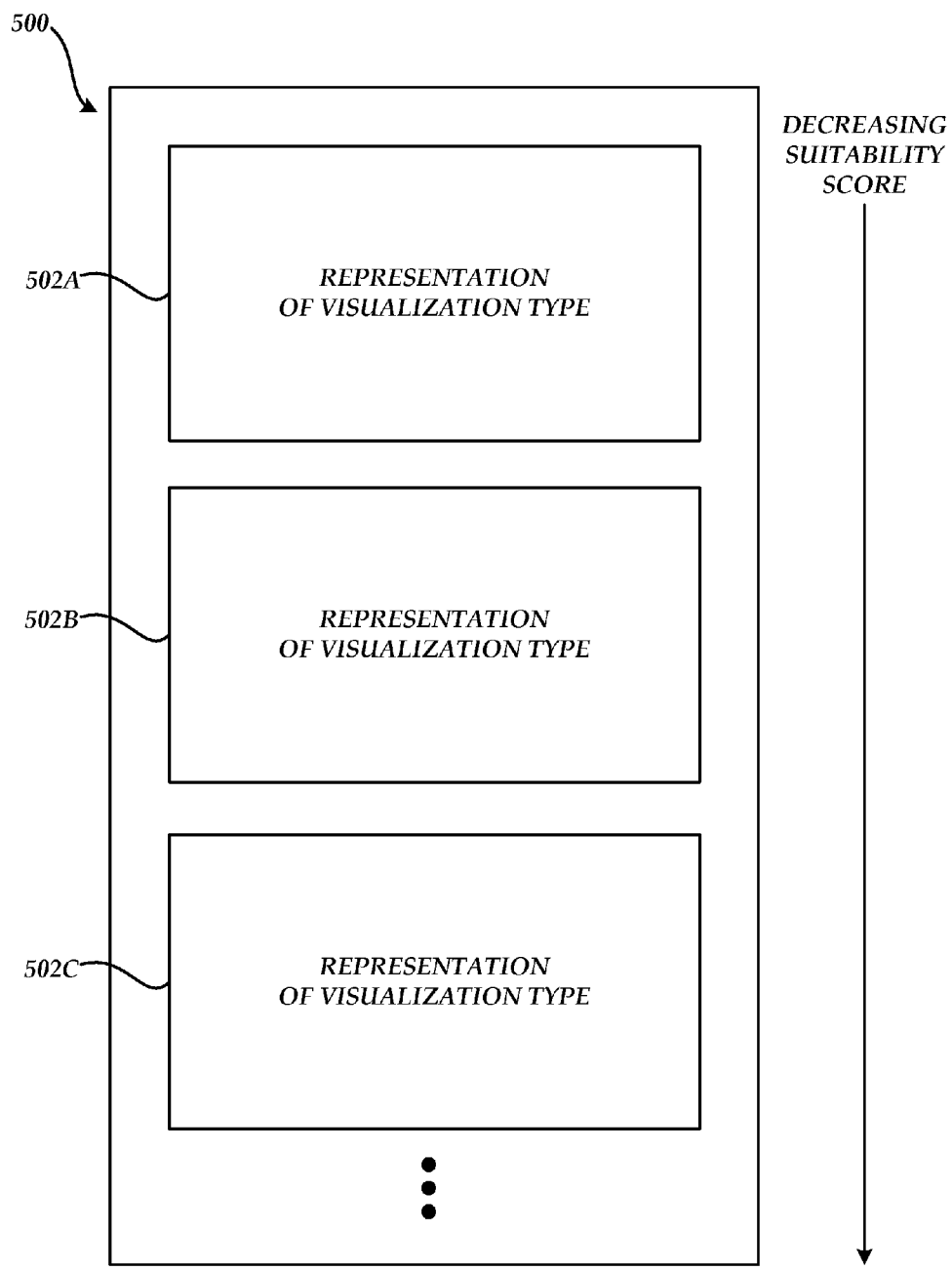
FIG. 5 is a user interface diagram showing an illustrative user interface provided herein for displaying a ranked list of visualization types in one embodiment presented herein.

Referring now to FIG. 5, additional details will be provided regarding the user interface described briefly above for presenting a ranked list of visualization types 110A-110N. As discussed above, the user interface shown in FIG. 5 may be utilized to present a user with a list of visualization types 110A-110N that have been ranked according to their suitability for use with the data set 106. In this regard, the visualization types 110A-110N are listed in order of decreasing suitability score 210. In this manner, the most suitable visualization type 110 is presented to the user first.

In one implementation, the user interface includes a user interface window 500 containing representations 502A-502C corresponding to the visualization types 110A-110N. The representations 502A-502C are also ordered according to decreasing suitability score 210 of the corresponding visualization type 110A-110N.

In one implementation, the representations 502A-502C comprise graphical representations of a corresponding visualization type 110A-110N when applied to the data set 106. For instance, the representations 502A-502C may correspond to graphical thumbnail images of a corresponding visualization type 110A-110N when utilized to render the data set 106. In this manner, a user can view a preview image showing how each of the visualization types 110A-110N will appear when utilized to render the contents of the data set 106.

Through the user interface shown in FIG. 5, the user is also provided significant information regarding the suitability of each of the visualization types 110A-110N for use with the data set 106. It should be appreciated that the user interface illustrated in FIG. 5 has been shown in a simplified form and is merely illustrative. As a result, it should also be appreciated that other types of user interfaces may be presented that utilize other types of user interface controls for showing the suitability of each of the visualization types 110A-110N according to a ranking based upon their fitness for use with the data set 106.

FIG. 6 shows an illustrative computer architecture for a computer 600 capable of executing the software components described herein for ranking the fitness of the visualization types 110A-110N in the manner presented above. The computer architecture shown in FIG. 6 illustrates a conventional desktop, mobile, handheld, laptop, or server computer and may be utilized to execute any aspects of the software components presented herein.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which are described in greater detail herein.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules and data files. In particular, the mass storage device 610 and the RAM 614 may store the desktop productivity application 102 and the document 104, each of which was described in detail above with respect to FIGS. 1-5. As also described above, the mass storage device 610 may also store a user profile 620 that includes data associated with a user of the computer 600. The mass storage device 610 and the RAM 614 may also store other types of program modules.

Based on the foregoing, it should be appreciated that technologies for ranking the fitness of visualization types are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for ranking a plurality of different visualization types, the method comprising:
    generating visualization metadata for each of the plurality of different visualization types, the visualization metadata comprises data describing one or more attributes of a visualization type that specifies
        a preferred input for each particular visualization type,
        particular axes and particular data series for each particular visualization type, and
        attributes regarding a preferred type of data for each of the particular axes or particular data series;
    generating data set metadata for each column independently for a data set, the data set metadata comprising data describing one of a data type or mathematical properties of the data set;
    calculating a suitability score for each of the plurality of different visualization types based upon the visualization metadata and the data set metadata, the suitability score comprising a number indicating the suitability of a visualization type for use with the data set, the number being based on data mapping rules that create a mapping between columns in the data set to one of each axis and each series of a visualization type of the plurality of visualization types;
    ranking the plurality of different visualization types based upon the calculated suitability scores;
    determining whether each of the calculated suitability scores exceeds a threshold;
    displaying on a user interface a visual representation of each of the plurality of different visualization types where the calculated suitability score exceeds the threshold, the visual representations displayed in order according to the ranking;
    receiving a selection of one of the displayed visual representations; and
    rendering the data set using the visualization type corresponding to the selected visual representation.

2. The method of claim 1, wherein calculating a suitability score for a visualization type comprises:
    using chart selection rules to calculate the suitability score for the data set in view of the mapping.

3. The method of claim 1, wherein ranking the plurality of visualization types based upon the calculated suitability scores comprises ranking the plurality of visualization types based upon the calculated suitability scores and upon the contents of a user profile.

4. The method of claim 1, wherein the data set comprises tabular data or other structured data.

5. The method of claim 1, wherein the visual representations comprise preview images showing the application of each visualization type to the data set.

6. A computer storage medium that is not a signal having computer executable instructions stored thereon which, when executed by a computer, cause the computer to:
    receive a request to assist with the selection of one of a plurality of different visualization types for use with a data set, the plurality of different visualization types for visualizing the data set, the plurality of different visualization types comprising at least two from the group of column chart, line chart, pie chart, bar chart, area chart, and scatter chart; and
    in response to the request, to generate a ranking of the different visualization types according to their suitability for use with the data set, the suitability based on data mapping rules that create a mapping between columns in the data set to one of each axis and each series of a visualization type of the plurality of visualization types, to display a user interface comprising visual representations of the different visualization types ordered according to the ranking, to receive a selection of one of the different visual representations displayed, and to render the data set using the visualization type that corresponds to the selected visual representation,
    wherein generating a ranking of the different visualization types according to their suitability for use with the data set comprises:
        generating visualization metadata for each of the plurality of different visualization types, the visualization metadata comprising data describing one or more attributes of a visualization type that specifies
            a preferred input for each particular visualization type,
            particular axes and particular data series for each particular visualization type, and
            attributes regarding a preferred type of data for each of the particular axes or particular data series;
        generating data set metadata for each column independently for the data set, the data set metadata comprising data describing one of a data type or mathematical properties of the data set;
        calculating a suitability score for each of the plurality of different visualization types based upon the visualization metadata and the data set metadata; and
        generating a ranking of the plurality of visualization types according to their suitability for use with the data set based upon the calculated suitability scores.

7. The computer storage medium of claim 6, wherein the data set comprises tabular data or other structured data having one or more columns.

8. The computer storage medium of claim 6, wherein the suitability score comprises a number indicating the suitability of a visualization type for use with the data set.

9. The computer storage medium of claim 8, wherein calculating a suitability score for a visualization type comprises:
    using chart selection rules to calculate the suitability score for the data set in view of the mapping.

10. The computer storage medium of claim 9, wherein generating a ranking of the visualization types according to their suitability for use with the data set comprises ranking the plurality of visualization types based upon the calculated suitability scores and upon the contents of a user profile.

11. A method for ranking a plurality of different visualization types, the method comprising:

generating visualization metadata for each of the plurality of different visualization types, the visualization metadata comprising data describing one or more attributes of a visualization type that specifies
- a preferred input for each particular visualization type, particular axes and particular data series for each particular visualization type, and
- attributes regarding a preferred type of data for each of the particular axes or particular data series;

generating data set metadata for each column independently for a data set, the data set metadata comprising data describing one of a data type or mathematical properties of the data set;

calculating a suitability score for each of the plurality of different visualization types based upon the visualization metadata and the data set metadata, the suitability score comprising a number indicating the suitability of a visualization type for use with the data set, the number being based on data mapping rules that create a mapping between columns in the data set to one of each axis and each series of a visualization type of the plurality of visualization types;

generating a ranking of the plurality of different visualization types based upon the calculated suitability scores;

displaying a user interface comprising visual representations corresponding to the plurality of different visualization types, the plurality of different visual representations being ordered according to the ranking;

receiving a selection of one of the plurality of different visual representations displayed on the user interface; and rendering the data set using the visualization type corresponding to the selected visual representation.

12. The method of claim 11, wherein calculating a suitability score for a visualization type comprises:

using chart selection rules to calculate the suitability score for the data set in view of the mapping.

13. The method of claim 12, wherein generating a ranking of the plurality of visualization types based upon the calculated suitability scores comprises ranking the plurality of different visualization types based upon the calculated suitability scores and upon the contents of a user profile.

* * * * *